United States Patent [19]

Gieskes

[11] Patent Number: 5,031,818
[45] Date of Patent: Jul. 16, 1991

[54] SOLDERING MACHINE OPERATING WITH A PROTECTIVE GAS AND PROVIDED WITH AUTOMATICALLY OPERATING LOCK DOORS

[75] Inventor: Koen A. Gieskes, Ulvenhout, Netherlands

[73] Assignee: Soltec B.V., Oosterhout, Netherlands

[21] Appl. No.: 541,798

[22] Filed: Jun. 21, 1990

[30] Foreign Application Priority Data

Jun. 23, 1989 [NL] Netherlands ............... 8901598

[51] Int. Cl.$^5$ ............................... B23K 3/00
[52] U.S. Cl. ................................ 228/42; 228/43; 228/221
[58] Field of Search ............ 228/219, 220, 221, 180.1, 228/180.2, 42, 43

[56] References Cited

U.S. PATENT DOCUMENTS

| 3,882,596 | 5/1975 | Kendziora | 228/219 |
| 4,166,563 | 9/1979 | Peyraud et al. | 228/221 |
| 4,838,476 | 6/1989 | Rahn | 228/221 |
| 4,921,156 | 5/1990 | Hohnerlein | 228/42 |

FOREIGN PATENT DOCUMENTS 8520254 12/1985 Fed. Rep. of Germany.

Primary Examiner—Samuel M. Heinrich
Attorney, Agent, or Firm—Wegner, Cantor, Mueller & Player

[57] ABSTRACT

The present invention relates to a soldering machine, comprising: a soldering chamber wherein the soldering process is performed; a first lock chamber connecting to the soldering chamber; a second lock chamber connecting to the soldering chamber; two openings each arranged between a lock chamber and the soldering chamber; two openings each connecting a lock chamber to the outside wherein each opening is closable by a door; means for creating a vacuum in the lock chambers; means for transporting objects for soldering from the outside through the first lock chamber, the soldering chamber and the second lock chamber.

11 Claims, 3 Drawing Sheets

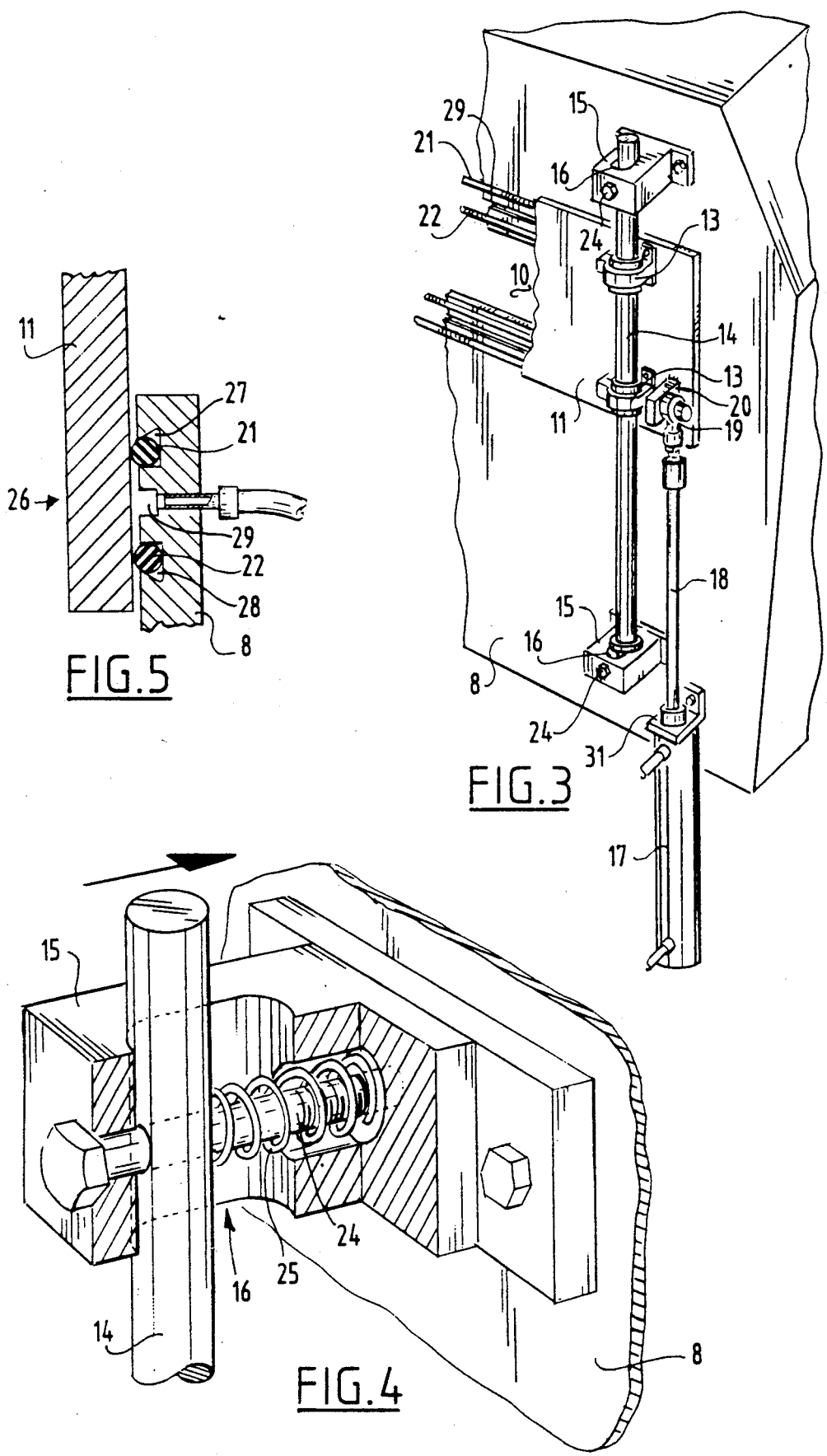

SOLDERING MACHINE OPERATING WITH A PROTECTIVE GAS AND PROVIDED WITH AUTOMATICALLY OPERATING LOCK DOORS

The present invention relates to a soldering machine, comprising:

a soldering chamber wherein the soldering process is performed;

a first lock chamber connecting to the soldering chamber;

a second lock chamber connecting to the soldering chamber;

two openings each arranged between a lock chamber and the soldering chamber;

two openings each connecting a lock chamber to the outside wherein each opening is closable by a door;

means for creating a vacuum in the lock chambers;

means for transporting objects for soldering from the outside through the first lock chamber, the soldering chamber and the second lock chamber.

Such a soldering machine is known from DE-U-8520254.

In this known device the doors are movable to in front of the openings such that they close off the openings, wherein use is made of a not wholly vertically extending movement of the door so that over the last part of the movement, when the door is already situated in the vicinity of the opening, the door already touches the opening to be closed off so that friction occurs there. This friction naturally also gives rise to wear so that after a period of time the seals will have to be replaced. This friction also results in the drive mechanism for the door movement having to overcome a quite great friction force so that this drive mechanism must take a robust form.

The object of the present invention is therefore to provide a soldering machine, wherein a drive mechanism can be used that requires a less heavy form, while wear of the seal is also avoided.

This object is achieved in that the doors are each arranged on the side of the openings remote from the respective lock chamber, that they are movable in the direction towards the lock chamber and that in the closed position a seal is active between the doors and the opening.

The sliding movement of the door along the wall in which the opening is arranged is avoided as a result of these steps because the last part of the movement takes place at a right angle to the surface for closure. The force required to perform this movement is herewith also considerably reduced.

A particularly preferred embodiment is developed when the respective doors are arranged on the outside of the vacuum chambers so that when a vacuum is created in the lock chambers the doors are pulled against the wall and a good seal is obtained. The applying of the vacuum in the lock chamber functions herein as driving for the last movement extending perpendicularly to the surface for closure.

According to the reflow principle the components are attached to the printed circuit board by a paste containing interalia tin and a flux. The paste serves to provide a provisional attachment. By heating taking place in the soldering machine the tin melts, the flux becomes active, and the resting components of the paste vaporise, so that a good soldering connection is achieved.

The present invention will subsequently be elucidated with reference to the annexed drawings, wherein:

FIG. 3 shows a partly broken away perspective view of the drive mechanism shown in FIG. 2 in the closed position of the door;

FIG. 4 is a partly broken away perspective detail view of a portion of the mechanisms shown in the FIGS. 2 and 3; and FIG. 5 is a sectional view of the door shown in FIG. 3 with the seal associated therewith.

Figure 1:
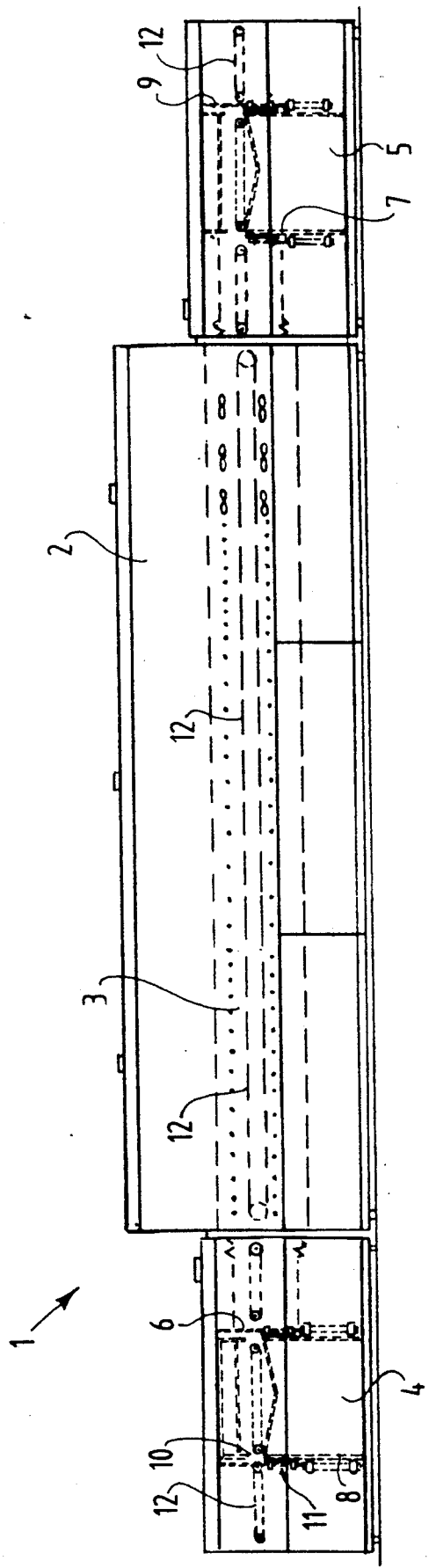
FIG. 1 shows a lengthwise sectional view of a soldering machine according to the present invention.

The soldering machine 1 depicted in FIG. 1 comprises a box 2 inside which is arranged a soldering chamber 3. On both sides the soldering chamber 3 adjoins the respective lock chambers 4, 5. Arranged between the lock chamber 4 and the soldering chamber 3 is a dividing wall 6, while a second dividing wall 7 is arranged between the soldering chamber 3 and the lock chamber 5. Both the lock chamber 4 and the lock chamber 5 are further provided with an outer wall 8 and 9 respectively. Arranged in each of the dividing walls 6, 7 and each of the outer walls 8, 9 is a transporting opening 10 which is closable by means of a door 11.

It is otherwise noted that in each of the chambers 3, 4, 5 a conveyor belt 12 is arranged for conveying the solder objects to be subjected to a soldering process.

As described thus far the soldering device corresponds with the soldering machine described in DE-U-8520254. With respect to the further construction of this machine reference is therefore made to the description of this specification.

The present invention relates more particularly to the doors 11 with which the transporting openings 10 can be closed off.

In order to ensure a correct functioning of the doors they must be arranged, together with the associated operating mechanism, on the outside of the respective lock chambers 4 and 5. That is, a door 11 is arranged on the outside of the outer wall 8, a door 11 is arranged on the side of the soldering chamber of the dividing wall 6, a door 11 is arranged on the side of the soldering chamber against the dividing wall 7 and a door 11 is arranged on the outside of the outer wall 9.

Figure 2:
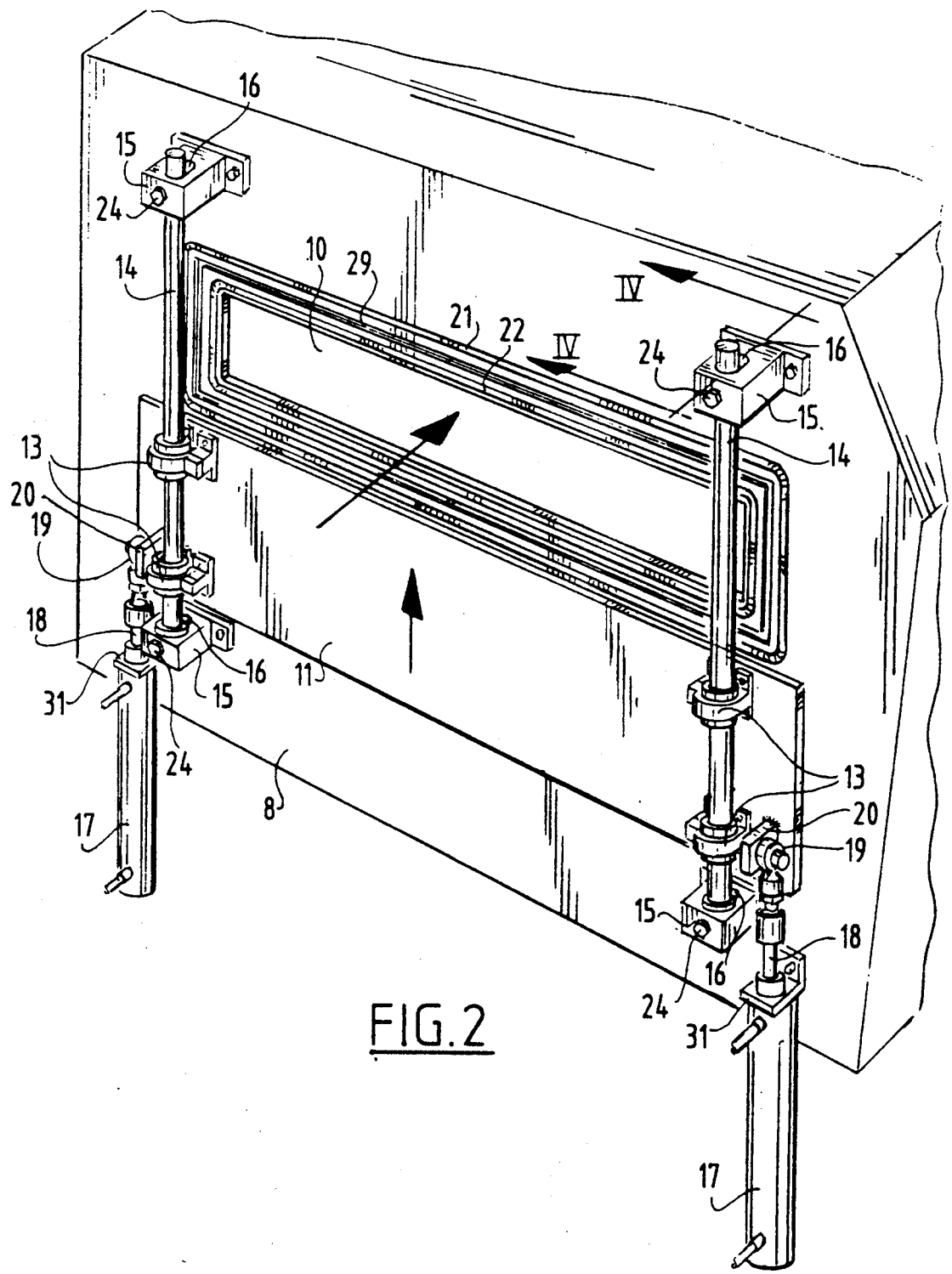
FIG. 2 is a perspective view of a door arranged on the outside of a lock chamber of the soldering machine, including the driving mechanism of this door.

FIG. 2 shows a perspective view of a door 11 with the associated operating mechanism. For the purposes of the description it is assumed that this is the door that is arranged against the outer wall 8.

The door 11 is guided by means of four brackets 13 by two guide rods 14 which extend substantially in vertical direction. Both guide rods 14 extend at the top end as well as the bottom end through two guide brackets 15. The guide brackets 15 are each provided with an elongate opening 16 through which the guide rod 14 extends so that the rod can perform a movement in horizontal direction away from and towards the wall 8. For fixing of the guide rod in vertical direction a device is arranged which will be elucidated below.

With the construction thus far described is therefore achieved that the door 11 can be moved in horizontal direction towards and away from the opening 10 to be closed off.

For driving the door 11 in vertical direction pneumatic cylinders 17 are arranged against the wall 8 by means of L-shaped brackets 31. Fixed to the piston rod 18 of both pneumatic cylinders 17 is a sleeve 19 which is rotatably connected to a bracket 20 attached to the door 11. When the piston rod 18, and therefore the sleeve 19, is moved upward the sleeve 19 will carry along the door bracket 20 so that the door 11 is therewith moved upward. In order to enable the movement in horizontal direction of the door 11 and the guide rods 14 the sleeve 19 is mounted rotatably on the bracket 20.

In order to ensure a good seal between the door 11 and the wall 8 two sealing O-rings 21, 22 made from an elastic material are arranged on the wall 8.

FIG. 3 shows the situation in which the door 11 wholly closes off the transporting opening 10. Through the suction effect of the vacuum the door 11 is here drawn wholly against the O-rings 21, 22 whereby a good seal is obtained. It can further be seen here how the guide rods 14 have moved towards the wall 8 compared to the situation shown in FIG. 2. It can also be seen that the piston rod 18 is situated in its topmost position in order to carry the door in front of the opening 10.

FIG. 4 further shows the guiding of the guide rods 14 in the brackets 15. The bracket 15 is provided herein with an elongate opening 23 through which the guide rod extends. In the bracket is further arranged a bolt 24 which extends through the opening 23 and through the guide rod 14 such that the guide rod 14 can move in horizontal direction. In order to press the guide rod 14 away from the wall 8 a spring 25 is arranged. It is however also conceivable that this force is generated by the resilience of the gasket 21 or by blowing.

Finally, FIG. 5 shows a sectional view of a wall 8 and a door 11, wherein a preferred embodiment 26 of a seal is arranged against the wall 8. The seal profile arranged around the opening 10 is formed by two concentric O-rings 21, 22 which are each fitted in a groove 27, 28. Located between both O-rings 21 and 22 is a channel 29 which, just as the O-rings 21, 22, extends around the opening 10. When the door 11 is closed the channel 29 is thus closed off on its open side by the door 11 resulting in a separate chamber wherein a vacuum prevails. Also when the vacuum inside the lock chamber is discontinued the vacuum inside the channel 29 will be maintained temporarily, so that the door 11 is held fixed against the opening 10. This locking can be discontinued again for instance by injection of nitrogen into the channel 29.

The operation of the soldering machine according to the present invention will now be described, wherein reference is otherwise again made to the previously mentioned German application DE-U-8520254.

The objects for soldering are supplied by means of conveyor belts 12, wherein the door 11 present in the wall 8 is opened as the lock chamber 4 is approached. The object for soldering is then moved into the lock chamber 4 whereafter the door 11 in the outer wall 8 is moved to the topmost position. The door 11 in the wall 6 is here already in the closed position.

Hereafter a vacuum is created in the lock chamber 4 by means of a vacuum pump (not shown in the drawings), wherein both doors 11 are moved by the suction effect of the vacuum against the respective opening 10 and as a result of the seal a virtually complete closure of the lock chamber 4 is achieved.

Nitrogen is subsequently injected into the lock chamber, this to a pressure such that there is no longer any difference in pressure between the soldering compartment 3 and the lock chamber 4, in order not to cause any pressure waves. Thereafter the door 11 is moved downward. The object for soldering is then moved by the conveyor belts through the opening in the wall 6 and enters the soldering chamber 3. Here it is subjected to a soldering operation. The door 11 in the wall 6 will subsequently be closed again, whereafter a following object for soldering is supplied.

The first object, which has been subjected in the meantime to the soldering process, moves through the opening in the wall 7 to the lock chamber 5, the door of which in the wall 9 is closed. The door in the wall 7 is then also moved upward and the door 11 in wall 9 opened. When the object has left the lock, the door in the wall 9 will be closed, following which a vacuum is created to remove influx air.

No object will be situated in the last vacuum chamber when the vacuum is created.

I claim:

1. A soldering machine, comprising:
   a soldering chamber;
   a first lock chamber connected to the soldering chamber via a first wall having an opening, wherein said first lock chamber is provided with an exterior wall having an exterior opening, and wherein each said opening is provided with a door;
   a second lock chamber connected to the soldering chamber via a second wall having an opening, wherein said second lock chamber is provided with an exterior wall having an exterior opening, and wherein each said opening is provided a door;
   vacuum means for creating a vacuum in the lock chambers; and
   transport means for transporting objects to be soldered through the exterior opening of the first lock chamber, the soldering chamber, and the second lock chamber;
   wherein each of the doors is arranged on a side of an associated opening away from the respective lock chamber and is movable in a direction toward the respective lock chamber, and wherein sealing means are provided for sealing between said doors and an associated well when said doors are in a closed position.

2. A soldering machine as claimed in claim 1, wherein each said door is forced away from the associated wall by spring means for generating a spring force.

3. A soldering machine as claimed in claim 2, wherein said spring means comprise a plurality of springs.

4. A soldering machine as claimed in claim 1, wherein when one of said doors is in the closed position at least one cavity is formed between the door and the associated wall, and wherein said cavity is connected to said vacuum means.

5. A soldering machine as claimed in claim 4, wherein said cavity is formed by a channel arranged within the seal and extending around the opening.

6. A soldering machine as claimed in claim 1, wherein said seal is on the associated wall surrounding the opening.

7. A soldering machine as claimed in claim 5, wherein said seal has a substantially U shaped cross-section wherein an inner edge thereof is lower than an outer edge.

8. A soldering machine as claimed in claim 1, wherein each of said doors is movable in a substantially vertical direction by means of two linear drive members.

9. A soldering machine as claimed in claim 8, wherein said linear drive members are pneumatic cylinders.

10. A soldering machine as claimed in claim 8, wherein each of said doors is guided by two rods each extending in the substantially vertical direction and movable in a substantially horizontal direction, wherein the door is guided by each of said rods by means of a bracket, and wherein each liner drive member is provided with an arm extending beneath the bracket.

11. A soldering machine as claimed in claim 1, wherein the soldering machine is adapted to execute soldering process according to the reflow principle.

* * * * *